(12) United States Patent
Nassiri Toussi et al.

(10) Patent No.: US 9,667,301 B1
(45) Date of Patent: May 30, 2017

(54) TRANSCEIVER FOR HETEROGENEOUS WLAN

(71) Applicant: Quantenna Communications, Inc., Fremont, CA (US)

(72) Inventors: Karim Nassiri Toussi, Belmont, CA (US); Hossein Dehghan, Diablo, CA (US); Bahador Amiri, Los Gatos, CA (US)

(73) Assignee: Quantenna Communications Inc., Fremont, CA (US)

( * ) Notice: Subject to any disclaimer, the term of this patent is extended or adjusted under 35 U.S.C. 154(b) by 0 days.

(21) Appl. No.: 14/817,195

(22) Filed: Aug. 3, 2015

Related U.S. Application Data (60) Provisional application No. 62/032,615, filed on Aug. 3, 2014, provisional application No. 62/113,418, filed on Feb. 7, 2015.

(51) Int. Cl.
*H04B 1/38* (2015.01)
*H04B 1/40* (2015.01)
*H04L 27/26* (2006.01)
*H04B 7/0452* (2017.01)
*H04L 5/00* (2006.01)
*H04L 1/00* (2006.01)
*H04W 84/12* (2009.01)

(52) U.S. Cl.
CPC ............ *H04B 1/40* (2013.01); *H04B 7/0452* (2013.01); *H04L 1/0003* (2013.01); *H04L 5/006* (2013.01); *H04L 27/26* (2013.01); *H04W 84/12* (2013.01)

(58) Field of Classification Search
CPC ....... H04B 1/40; H04B 7/0452; H04L 1/0003; H04L 5/006; H04L 27/26

USPC ................................. 455/73, 67.11, 82, 522
See application file for complete search history.

(56) References Cited

U.S. PATENT DOCUMENTS 9,226,267 B2 * 12/2015 Warner ............... H04B 7/0608
2010/0052652 A1 * 3/2010 Mitchell ............... H04B 17/21
324/76.19

(Continued)

OTHER PUBLICATIONS

"Dualcomm WiFi-over-Coax Extender Kit"; Dualcomm Technology, Inc.; http://www.dual-comm.com/wifi-over-coax-extender.htm Date retrieved by www.archive.org: Mar. 13, 2014.

*Primary Examiner* — Md Talukder
(74) *Attorney, Agent, or Firm* — IP Creators; Charles C Cary (57) ABSTRACT

A wireless transceiver for a wireless local area network (WLAN) including a port evaluator and a port correlator. Transceiver radio frequency "RF" communication ports are configured to couple to at least one of a wired or wireless communication medium. Shared and discrete components form transmit and receive chains each coupled to a corresponding RF communication port for communications with associated transceiver nodes. The port evaluator is coupled to each of the RF communication ports and configured to evaluate the selected communication channel on each of the RF communication ports with respect to each of the plurality of transceiver nodes. The port correlator is coupled to the shared and discrete components and to the port evaluator and configured to correlate each of the transceiver nodes with a corresponding subset of the RF communication ports supporting optimal communications therewith based on the evaluation by the port evaluator.

8 Claims, 9 Drawing Sheets

(56) References Cited

U.S. PATENT DOCUMENTS

| | | | | |
|---|---|---|---|---|
| 2010/0296423 A1* | 11/2010 | Heydari | ............... | H04B 7/04 370/310 |
| 2011/0243007 A1* | 10/2011 | Xiao | ............... | H04B 7/0447 370/252 |
| 2012/0201254 A1* | 8/2012 | Miyazaki | ............... | H04L 12/12 370/419 |
| 2013/0078848 A1* | 3/2013 | Kummetz | ............... | H04Q 1/138 439/488 |
| 2014/0233666 A1* | 8/2014 | Campos | ............... | H04B 7/0413 375/267 |
| 2014/0269862 A1* | 9/2014 | Krewski | ............... | H01Q 21/29 375/219 |

* cited by examiner

FIG. 4 Transceiver supporting Heterogeneous WLAN

FIG. 5    Heterogenous Transceiver Operation

TRANSCEIVER FOR HETEROGENEOUS WLAN

CROSS REFERENCE TO RELATED APPLICATION

This application claims the benefit of prior filed Provisional Application No. 62/032,615 filed on Aug. 3, 2014 entitled "MU-MIMO Network with Wired and Air Interfaces" and Provisional Application No. 62/113,418 filed on Feb. 7, 2015 entitled "MU-MIMO WiFi Transmission over Wired and Wireless Media using Multiple Carrier Frequencies" both of which are incorporated herein by reference in their entirety as if fully set forth herein.

BACKGROUND OF THE INVENTION

1. Field of Invention

The field of the present invention relates in general to wireless local area networks (WLAN) including wireless access points (WAP) and wireless stations and methods for sounding same.

2. Description of the Related Art

Home and office networks, a.k.a. wireless local area networks (WLAN) are established and serviced using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax". Communications follow a hub and spoke model with a WAP at the hub and the spokes corresponding to the wireless links to each 'client' device.

After selection of a single communication channel for the associated home network, access to the shared communication channel relies on a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the wireless medium is in use.

Communications on the single communication medium are identified as "simplex" meaning, one communication stream from a single source node to one or more target nodes at one time, with all remaining nodes capable of "listening" to the subject transmission. To confirm arrival of each communication packet, the target node is required to send back an acknowledgment, a.k.a. "ACK" packet to the source. Absent the receipt of the ACK packet the source will retransmit the unacknowledged data until an acknowledgement is received, or a time-out is reached.

To improve the throughput on each point-to-point link between a WAP and a station, multiple antennas may be used. Multiple-Input Multiple-Output (MIMO) equipped WAPs and stations have been gaining in popularity due to their ability to provide increased performance without the need to increase bandwidth and power. In a MIMO system, both transmitter and receiver have multiple antennas. This creates a matrix channel between the signals coming out of the transmit antennas and the signals observed at the receiver antennas. Where, as in a home or office, the environment has sufficiently rich signal scattering the MIMO system will support simultaneous independent data streams which increases throughput. MIMO transceivers with multiple antennas can exploit any of a number of techniques to increase link throughput specifically: a) controlling how data is loaded on to each antenna, b) how data is coded, and c) how the antennas signals are aimed at the receiving station. Typically, during an association phase the transmitting and receiving device identify their capabilities and agree on a compatible, i.e. common denominator, set of loading, coding and aiming options after which communications are initiated on the link.

In order to characterize the multipath communication channel between the WAP and each station a MIMO sounding is conducted. An explicit sounding as specified in the IEEE 802.11n and 802.11ac standards consists of the transmission of a known sequence from the WAP to each associated station, followed by a sounding response from the station characterizing the communication channel between the WAP and itself. The WAP uses the explicit sounding response to focus its MIMO antennas in a manner which improves either or both signal strength at the station or downlink throughput thereto.

What is needed are improved methods for extending the coverage area between the WAP and its associated stations.

SUMMARY OF THE INVENTION

The present invention provides a method and apparatus for a wireless transceiver for a wireless local area network (WLAN). In an embodiment of the invention, the wireless transceiver apparatus for the WLAN supporting multiple-input multiple-output (MIMO) wireless communications between associated transceiver nodes on a selected one of a plurality of communication channels. The transceiver apparatus includes: radio frequency "RF" communication ports, shared and discrete components forming transmit and receive chains, a port evaluator and a port correlator. The plurality of RF communication ports are configured to couple to at least one of a wired and a wireless communication medium. The plurality of shared and discrete components are coupled to one another to form transmit and receive chains each coupled to a corresponding one of the plurality of RF communication ports for orthogonal frequency division multiplexed (OFDM) MIMO WLAN communications with the plurality of associated transceiver nodes. The port evaluator is coupled to each of the plurality of RF communication ports and configured to evaluate the selected communication channel on each of the RF communication ports with respect to each of the plurality of transceiver nodes. The port correlator is coupled to the plurality of components and the port evaluator and configured to correlate each of the plurality of transceiver nodes with a corresponding subset of the RF communication ports supporting optimal communications therewith based on the evaluation by the port evaluator.

The invention may be implemented in hardware, firmware or software.

Associated methods and computer readable media containing program instructions are also claimed.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF TH EMBODIMENTS

The present invention provides a method and apparatus for a heterogeneous wireless local area network (WLAN). A wireless transceiver for this WLAN may couple to other devices, i.e. wireless access point (WAP) or stations, on the WLAN wirelessly or via existing coaxial cabling in the home or office. This latter capability allows an extended reach and coverage for the WLAN using existing coaxial cable for remote antenna(s) or for direct wired connection to remote stations, e.g. HDTVs. These capabilities are provided without departing from the traditional WLAN architecture, and without extensive modifications to either WAP or stations embodying this invention.

FIGS. 1A-D are representative diagrams of Prior Art homogeneous wireless local area network (WLAN) including: a plan view, a channel diagram, a network packet diagram and an antenna power table respectively.

Figures 1A, 1B, 1C, 1D:
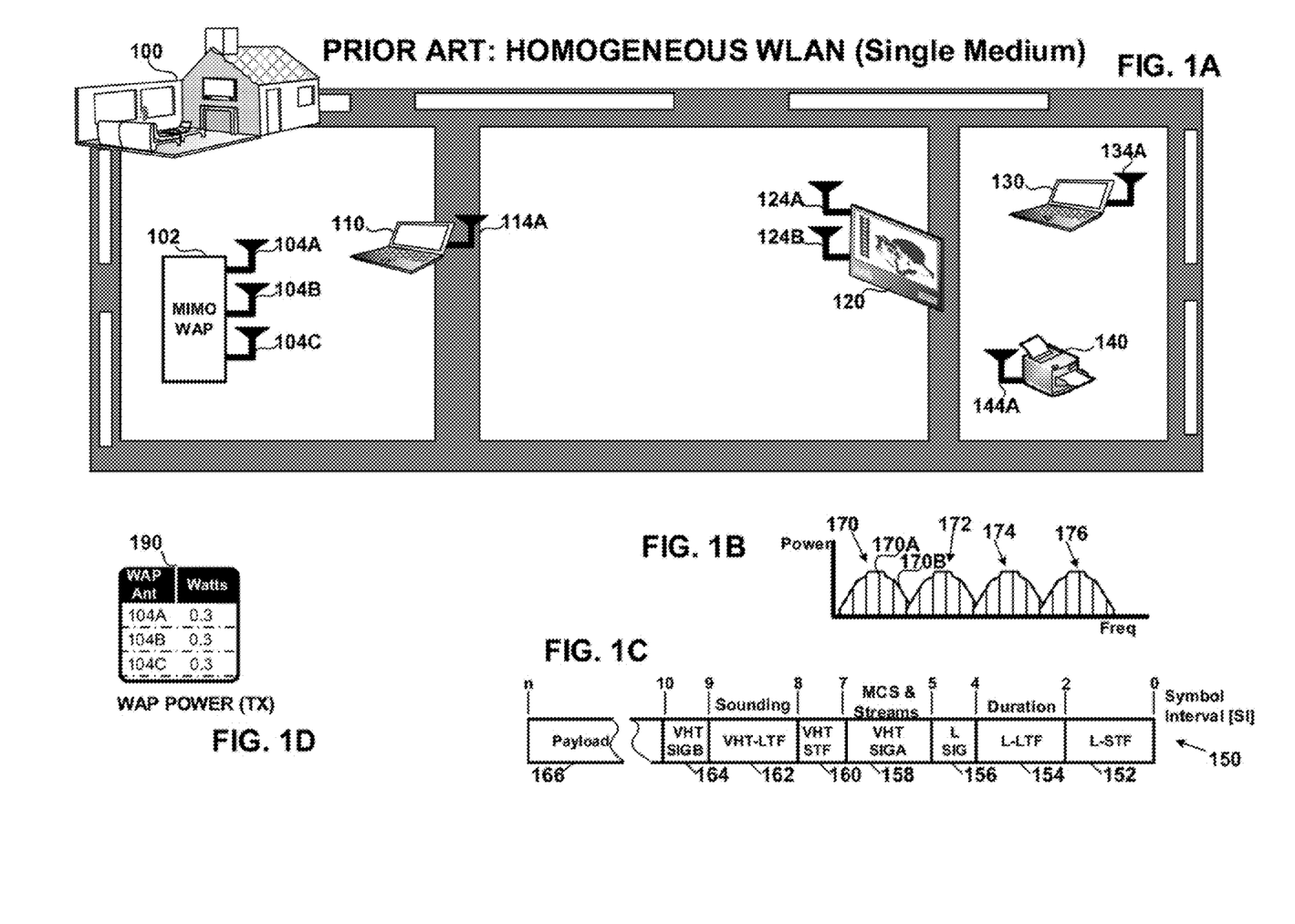
FIGS. 1A-D are representative diagrams of Prior Art homogeneous wireless local area network (WLAN) including: a plan view, a channel diagram, a network packet diagram and an antenna power table, respectively.

FIG. 1A is a plan view of a residence 100 with a WLAN including a multiple-input multiple-output (MIMO) wireless access point 102 with an array of MIMO antenna 104A-C coupled via a wireless communication medium wireless stations. The wireless stations include: notebook computer 110 with a single antenna 114A, HDTV 120 with two antenna 123A-B, notebook computer 130 with a single antenna 134A, and printer 140 with a single antenna 144A.

FIG. 1B is a WIFI channel diagram in which the x and y axis dimension frequency vs. power respectively for four of the 20 MHz communication channels, 170, 172, 174, 176 associated with the IEEE 802.11ac WiFi standard. Each communication channel may be selected individually to support a wireless local area network (WLAN). Alternately more than one of the 20 Mhz channels can be aggregated in various combinations to form a 40 Mhz, 80 Mhz or 160 Mhz Aggregate channel to support WLAN communications. Each 20 Mhz communication channel is orthogonal frequency division multiplexed (OFDM), i.e. divided into sub-channels or tones. Each 20 Mhz channel has 56 independently modulated sub-carriers or tones. Communication channel 170 has sub-channels a.k.a. tones, e.g. sub-channels 170A, 170B. This channel layout corresponds to that specified in IEEE 802.11ac for example.

FIG. 1C is a network packet diagram of a WLAN packet including the sounding field. All WLAN packets whether associated with authentication, association, sounding or communication of user data include a ubiquitous header portion. All WLAN packet headers include various preamble fields with known sequences which allow the receiving station to synchronize reception with packet boundaries and to determine the received channel. FIG. 1C shows a packet 150 and the corresponding symbol interval (SI) required to transmit each field thereof. The header includes a legacy portion containing the L-STF 152, L-LTF 154 and L-SIG 156 fields and a very high throughput portion containing the VHT-SIGA 158, VHT-STF 160, VHT-LTF 162 and VHT-SIGB 164 fields. The payload portion 166 may depending on the packet type contain: user data, no user data or feedback from an explicit sounding for example. The legacy (L), long (LTF) and short (STF) training and signal (SIG) 152-156 fields are compatible with stations supporting only the IEEE 802.11n or earlier standards. The remaining signal and training fields are intended only for very high throughput, e.g. IEEE 802.11ac compliant devices. The VHT-SIGA field 158 contains information on the modulation and coding scheme (MCS) and number of streams of the communication. The VHT-STF field 160 is used for automatic gain control (AGC). The VHT-LTF field 162, a.k.a. channel estimation or sounding field, contains a long training sequence used for MIMO channel estimation by the receiver. All WLAN packets whether associated with communicating a sounding or the communication of user data include a similar header portion with the same training and signal preamble fields with known sequences which allow the receiving station to synchronize reception with packet boundaries and to determine the received channel.

FIG. 1D is an antenna power table 190. Typically the maximum RF power is proscribed by the relevant IEEE 802.11 communication standard. The allowable RF power limit of the WAP is proscribed by the standard and typically is 1 watt with each of the MIMO antenna configured accordingly; e.g. 0.33 watt per antenna in the example shown.

Figure 2A:
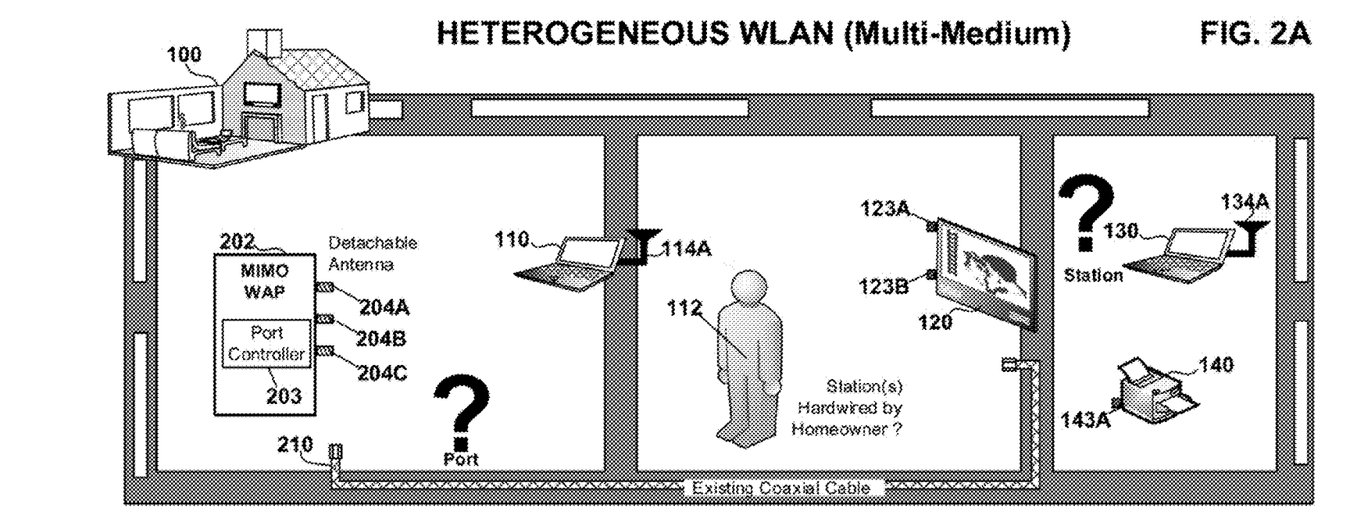
FIGS. 2A-2B are representative diagrams of heterogeneous WLAN in accordance with an embodiment of the invention including: a plan view of the WLAN and a hardware diagram of representative radio frequency "RF" port connector respectively.
Figure 2B:
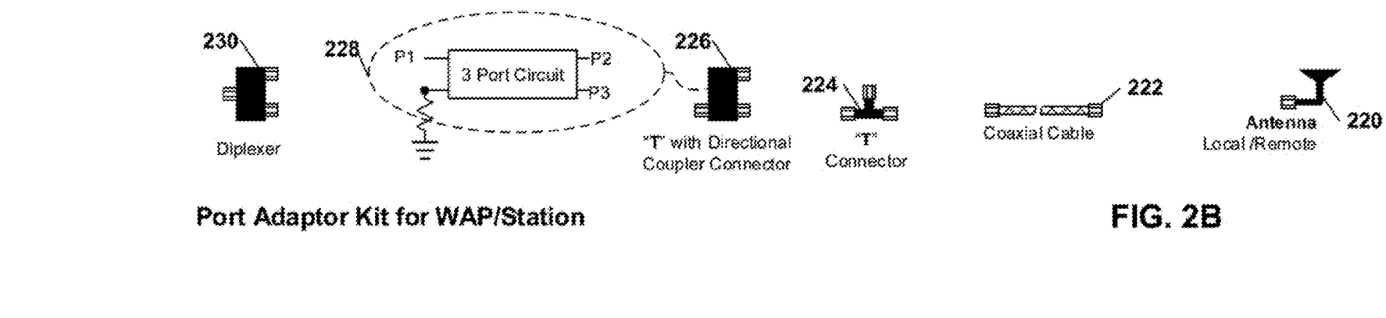

FIGS. 2A-2B are representative diagrams of heterogeneous WLAN in accordance with an embodiment of the invention including: a plan view of the WLAN and a hardware diagram of representative radio frequency "RF" port connector respectively. The heterogeneous WLAN in residence 100 includes the MIMO heterogeneous WAP 202 with an array of MIMO RF ports 204A-C. The WAP includes a port controller 203 for evaluating each port in terms of the corresponding communication channel between it and an accessible station. The port controller subsequently correlates each port with a subset of associated stations with which communications may be effected. Unlike a prior art WAP in which all stations are accessible via all antennas, the heterogeneous WAP has some of the MIMO ports coupled either via a remote antenna or via a direct coaxial connection to selected stations. A port that is direct connected to a station, can't be used for communications with any of the remaining stations on the WLAN and vice-versa. The port controller discovers these connections as well as the communication medium associated with each, e.g. wired or wireless. The RF ports 204A-C are homeowner or technician 112 configurable during installation for wired or wireless connections to various ones of the stations which make up the WLAN. This configurability allows for an extended reach and coverage for the WLAN using existing or new coaxial cabling within the residence for remote antenna(s) or a direct wired connection to remote stations, e.g. HDTVs. These capabilities are provided without departing from the traditional WLAN architecture, and without extensive modifications to either WAP or stations embodying this invention. In alternate embodiments of the invention the heterogeneous WAP may have some of the RF ports dedicated to antenna and others configurable for connection to wired or wireless communication medium. In still another embodiment of the invention some of the RF ports of the heterogeneous WAP may be dedicated to antenna and one or more remaining ports dedicated to a wired communication medium, i.e. coaxial cable. Wired connections to a remote station or a remote antenna may be made using existing or new coaxial cable 210 within the home or business. The wireless stations include: notebook computer 110 with its single antenna 114A, HDTV 120, notebook computer 130 with its single dedicated RF antenna 134A, and printer 140. The antenna on HDTV have been unscrewed exposing RF ports 123A-B. The antenna on printer 140 has been removed exposing RF port 143A.

FIG. 2B is a hardware diagram of representative radio frequency "RF" passive connectors for configuring the RF ports of the wireless transceiver, e.g. WAP 202 or station 120 for connection to wireless or wired communication medium. The passive connectors 220-230 are configured for manual coupling to at least one of the RF communication ports of the heterogeneous WAP or station. The passive connectors can configure an RF port as a selected one of: a local antenna; a coaxial cable terminating at a remote antenna; and a coaxial cable terminating at a corresponding one of the associated transceiver nodes.

Passive connector 220 is an RF antenna. RF antenna 220 may be direct coupled to an RF port of a WAP or station, thus serving as a local antenna. Alternately, antenna connector 220 may also be coupled to a terminus of a coaxial cable which itself may be direct coupled to an RF port of a WAP or station.

Passive connector 222 is a coaxial cable which may directly couple an RF port of a WAP to a station. Alternately, the coaxial cable may be used to provide a remote antenna in combination with RF antenna 220.

Passive connector 224 is a "T" connector which may be used to connect multiple stations to a single coaxial cable. Alternately, the "T" connector may be used to couple a coaxial cable directly to one station and to remaining stations in a room via a remote antenna.

Passive connector 226 is a Directional Coupler which may be used in the same configurations as the "T" connector 224 but with distinct advantages in terms of signal isolation. Directional Couplers have four ports, but as shown in view 228 one of the ports is terminated with a matched load, e.g. 50 ohms. Effectively, this results in a 3-port device. The remaining ports P1-3 are shown. Port 1 is the input port where power is applied. Port 3 is the coupled port where a portion of the power applied to port 1 appears. Port 2 is the transmitted port where the power from port 1 is output, less the portion that went to port 3. Directional couplers are bidirectional. Thus if P1 is coupled to a transmitting WAP and P2 to a station, and P3 to a remote antenna the transmit power will be split between ports P2 and P3 with a 0.5 dB insertion loss between port P1 and Port P2 and a 10 dB coupling loss between port P1 and Port P3. In the opposite direction, e.g. during reception most of the received power from either Port P2 or Port P3 goes directly to P1 with more than a 30 dB directivity loss to the non receiving one or ports P2 and port P3.

Passive connector 230 is a diplexer which operates as a frequency splitter or combiner depending on the direction of communication flow. This connector can thus be used to provide, using frequency division multiple access (FDMA), two concurrent discrete communication channels from two distinct chains of the WAP via a single coaxial cable to two stations.

FIGS. 3A-B, 3C-D, 3E-F, 3G-H, 3J-I are pairs of plan view and data processing diagrams of a heterogeneous WLAN in accordance with various embodiments of the invention.

Figure 3A:
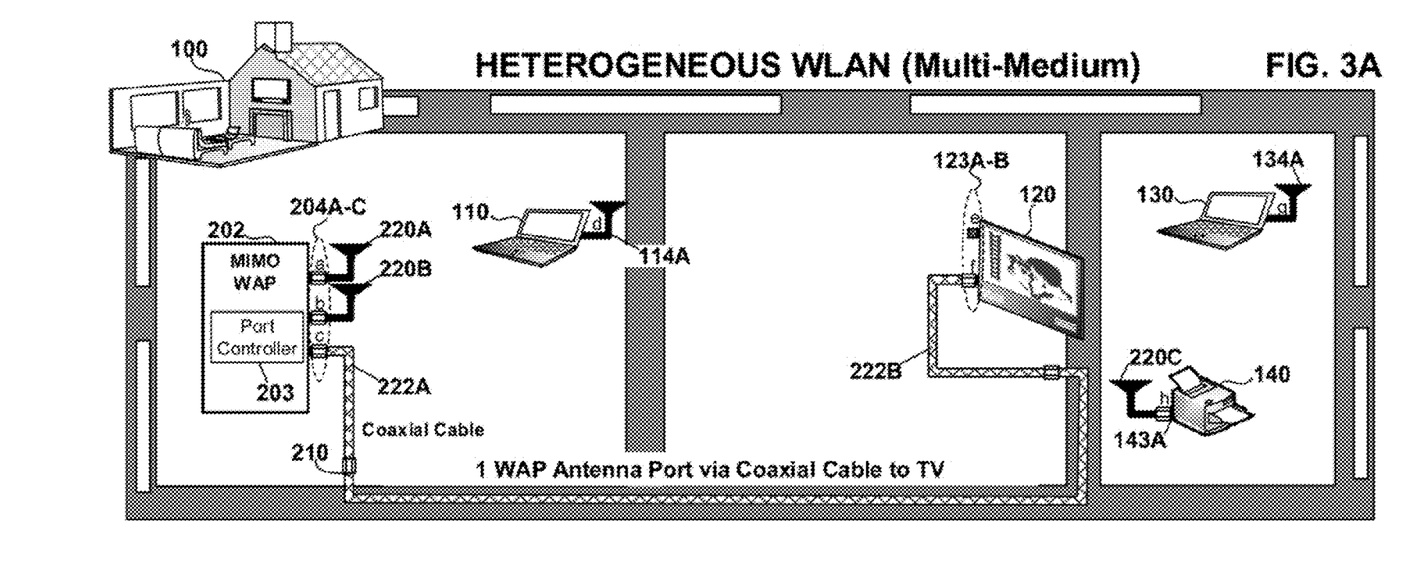
FIGS. 3A-B, 3C-D, 3E-F, 3G-H, 3J-I are pairs of plan view and data processing diagrams of a heterogeneous WLAN in accordance with various embodiments of the invention.

FIG. 3A shows an embodiment of the heterogeneous WLAN in residence 100. One of the WAP ports has a wired connection to one of the WLAN stations. Specifically, two of the RF ports, 204A-B of the WAP 202 are coupled to local antenna 220A-B, respectively. The remaining RF WAP port 204C has been coupled by the homeowner via coaxial cable connectors 222A-B and existing coaxial cable 210 to the HDTV station 120 and specifically RF port 123B thereof. On the printer station 140 the RF port 143A is coupled to a local antenna 220C. The port controller 203 discovers and controls these heterogeneous RF port connections to varied communication mediums and stations as shown in FIG. 3B.

Figure 3B:
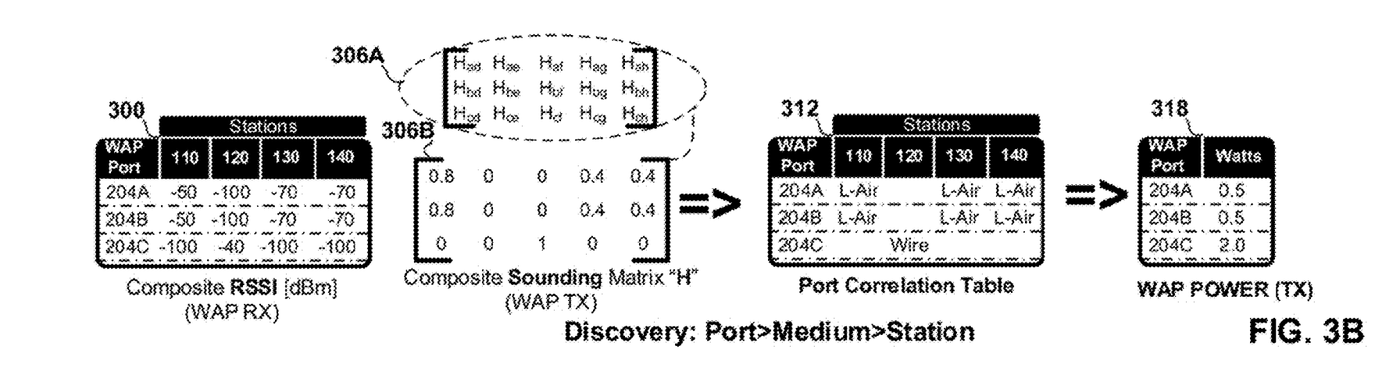

FIG. 3B shows a progression of various data processing tables and matrices associated with the discovery and control of the WAP's RF ports 204A-C by the port controller 203. During authentication, association and or show time the port controller evaluates the communication channel and specifically a Received Signal Strength Indication (RSSI) for each station on each port as shown in composite RSSI table 300. During show time the port evaluates the communication channel between each port and each station via the corresponding coefficients 306B of a composite sounding matrix "H" 306A derived from one or more explicit or implicit soundings. An explicit sounding by the WAP of a target station involves a request for channel information made by the WAP and feedback of a sounding response from the target station in which the communication channel of the link between the WAP and the target station is characterized. Alternately, an implicit sounding of a communication channel linking a WAP and a station, is obtained by the WAP's measurement of the reverse channel between the station and the WAP. The WAP uses the sounding field in packets received from the target station to evaluate the reverse channel there between. The reciprocity between the forward and reverse channels allows such utilization of the implicit soundings. For notational purposes the two letter subscripts in the composite matrix 306A denote the unique communication paths between a transmitting RF port on the WAP (a, b, c) and a receiving RF port or antenna on any of the stations (d, e, f, g, h) as shown in FIG. 3A.

When evaluation of ports, stations and channels there between is completed processing proceeds to the port correlation table 312. The port correlation table correlates each port with the subset of WLAN stations accessible therefrom as well as the medium, e.g. wired or wireless, of communication there between. Station 120 has a wired connection exclusively to port 204C as indicated by the inaccessibility of this station from any of the other RF ports as measured in either the composite RSSI table 300 or the composite sounding matrix 306B. Remaining stations 110, 130, 140 are all accessible wirelessly via local antennas 220A-B on any of the remaining RF ports 204A-B.

Based on the port correlation table the per port power allocation is set by the port controller 203, as shown in the WAP power table 318. The port controller 203 varies the power on each of the remaining wireless RF ports inversely in relation to a number of such wireless communication ports, e.g. the per port power on the remaining wireless ports 204A-B is increased from 0.33 to 0.5 watts. Absent this power increase the wireless communications to stations 110, 130 and 140 would be impaired. Additionally, power is also increased on wired port 204C to 2 watts since the power mask constraints imposed by the IEEE 802.11 standard no longer apply.

After the static power settings on each RF port and associated transmit and receive chains is complete the port controller then controls show time communications. For downlinks the port controller may exploit the correlation information during either single user or multi-user downlinks with associated stations. During a single user downlink to HDTV 120 for example, the port controller 203 may temporarily save energy by reducing power on the transmit chains coupled to ports 204A-B which have no access to the downlinked station. Alternately, during a Multi User (MU) MIMO downlink to HDTV 120 and one of the remaining stations, e.g. station 110, the port controller can use a simplified or sparse precoding matrix to spatially multiplex the concurrent communications based on its knowledge of the orthogonality of ports 204A-B versus port 204C with respect to the two targeted stations 110 and 120.

Figure 3C:
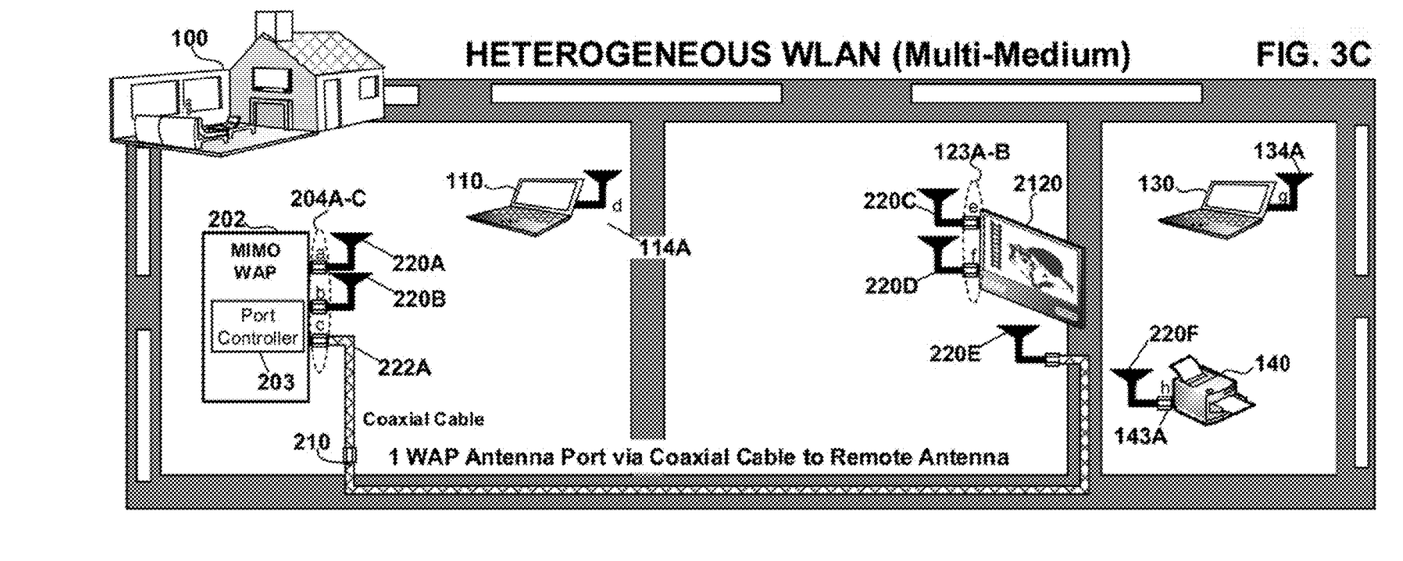

FIG. 3C shows an embodiment of the heterogeneous WLAN in residence 100. One of the WAP ports has a wired connection to the WLAN stations via a remote antenna. Specifically, two of the RF ports, 204A-B of the WAP 202 are coupled to local antenna 220A-B, respectively. The remaining RF WAP port 204C has been coupled by the homeowner via coaxial cable connector 222A and existing coaxial cable 210 to remote antenna 220E. The HDTV station 120 and specifically RF ports 123A-B thereof are coupled to local antenna 220C-D respectively. On the printer station 140 the RF port 143A is coupled to a local antenna 220F. The port controller 203 discovers and controls these heterogeneous RF port connections to varied communication mediums and stations as shown in FIG. 3D.

Figure 3D:
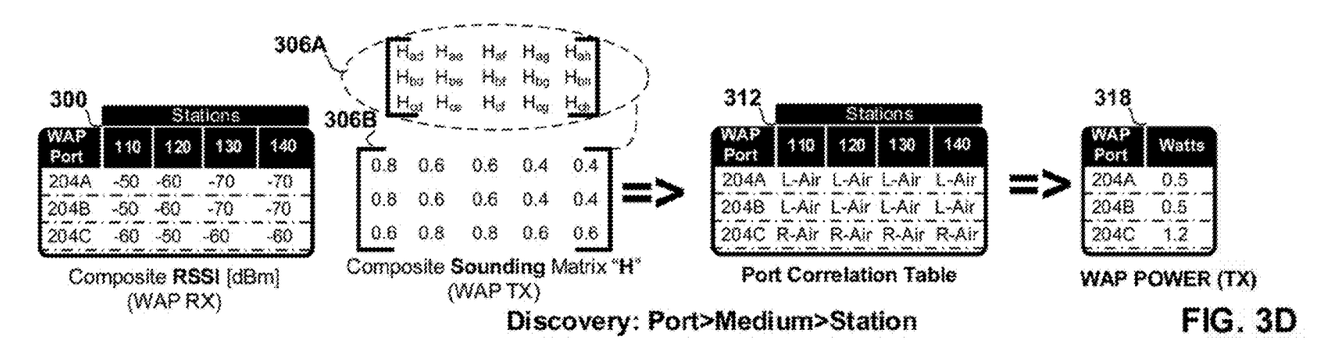

FIG. 3D shows the progression of various data processing tables and matrices associated with the discovery and control of the WAP's RF ports 204A-C by the port controller 203. During authentication, association and or show time the port controller evaluates the communication channel and specifically RSSI for each station on each port as shown in composite RSSI table 300. During show time the port evaluates the communication channel between each port and each station via the corresponding coefficients 306B of a composite sounding matrix "H" 306A derived from one or more explicit or implicit soundings.

When evaluation of ports, stations and channels there between is completed processing proceeds to the port correlation table 312. The port correlation table correlates each port with the subset of WLAN stations accessible therefrom as well as the medium, e.g. wired or wireless, of communication there between. Any one of the WAP's RF ports 220A-C can access any one of the associated stations 110, 120, 130, 140. However the remote antenna 220E on port 204C provides superior access to the stations 120, 130, 140 which are furthest from the WAP as indicated by either the composite RSSI or Sounding Tables 300, 306B respectively.

Based on the port correlation table 312 the per port power allocation is set by the port controller 203, as shown in the WAP power table 318. The port controller 203 varies the power on each of the local wireless RF ports inversely in relation to a number of such wireless communication ports, e.g. the per port power on the local wireless ports 204A-B is increased from 0.33 to 0.5 watts. Absent this power increase the wireless communications to the stations would be impaired. Additionally, power is also increased on port 204C to 1.2 watts since the power mask constraints imposed by the IEEE 802.11 standard apply separately to the local and remote antennas. The power on the RF port 204C coupled to the single remote antenna is set higher than might appear appropriate to account for the attenuation of power on the coaxial cable coupled to the remote antenna. The port controller makes this determination.

After the static power settings on each RF port and associated transmit and receive chains is complete the port controller then controls show time communications. For downlinks the port controller may exploit the correlation information during either single user or multi-user downlinks with associated stations. During a single user downlink to HDTV 120 for example, the port controller 203 may temporarily save energy by reducing power on the transmit chains coupled to ports 204A-B which have a much weaker signal at the HDTV than does the remote antenna 220E on port 204C. Alternately, during a Multi User (MU) MIMO downlink to HDTV 120 and one of the remaining stations, e.g. station 110, the port controller can use a simplified or sparse precoding matrix to spatially multiplex the concurrent communications based on its knowledge of the discrete signal paths of ports 204A-B versus port 204C with respect to the two targeted stations 110 and 120.

Figure 3E:
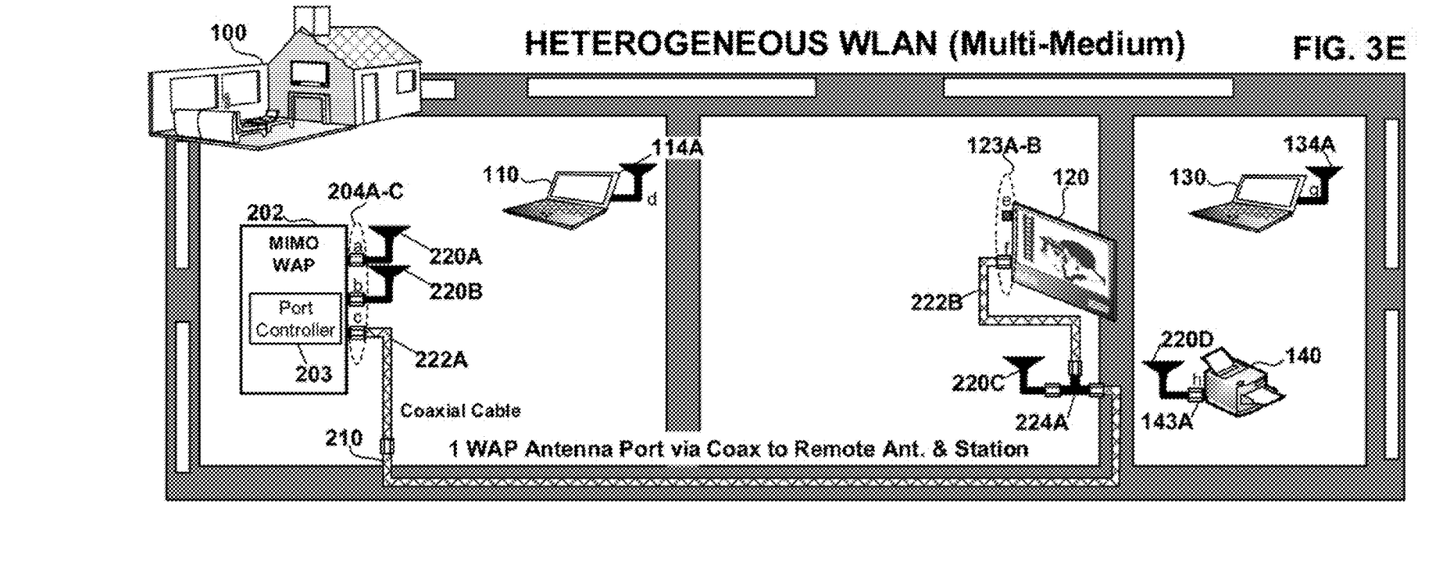

FIG. 3E shows an embodiment of the heterogeneous WLAN in residence 100. One of the WAP ports has a wired connection to one of the WLAN stations as well as to a remote antenna. Specifically, two of the RF ports, 204A-B of the WAP 202 are coupled to local antenna 220A-B, respectively. The remaining RF WAP port 204C has been coupled by the homeowner via coaxial cable connectors 222A-B and existing coaxial cable 210 to the HDTV station 120 and specifically RF port 123B thereof. Additionally, an intermediate "T" junction 224A in the coaxial cable provides a remote antenna 220C in the same room as the HDTV 120. On the printer station 140 the RF port 143A is coupled to a local antenna 220C. The port controller 203 discovers and controls these heterogeneous RF port connections to varied communication mediums and stations as shown in FIG. 3F.

Figure 3F:
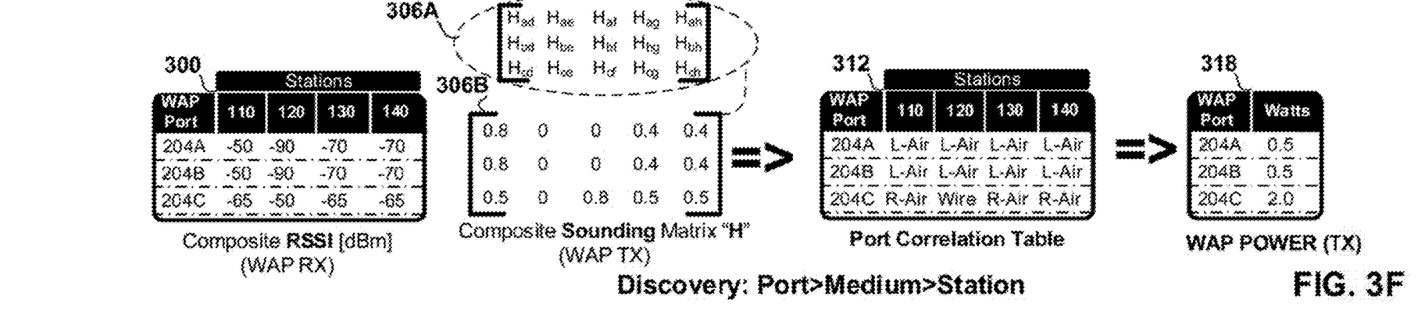

FIG. 3F shows a progression of various data processing tables and matrices associated with the discovery and control of the WAP's RF ports 204A-C by the port controller 203. During authentication, association and or show time the port controller evaluates the communication channel and specifically a RSSI for each station on each port as shown in composite RSSI table 300. During show time the port evaluates the communication channel between each port and each station via the corresponding coefficients 306B of a composite sounding matrix "H" 306A derived from one or more explicit or implicit soundings.

When evaluation of ports, stations and channels there between is completed processing proceeds to the port correlation table 312. The port correlation table correlates each port with the subset of WLAN stations accessible therefrom as well as the medium, e.g. wired or wireless, of communication there between. Station 120 has a wired connection exclusively to port 204C as indicated by the inaccessibility of this station from any of the other RF ports as measured in either the composite RSSI table 300 or the composite sounding matrix 306B. Remaining stations 110, 130, 140 are all accessible wirelessly via local antennas 220A-B on RF ports 204A-B and via remote antenna 220C on RF port 204C.

Based on the port correlation table the per port power allocation is set by the port controller 203, as shown in the WAP power table 318. The port controller 203 varies the power on each of the remaining wireless RF ports coupled to local antenna inversely in relation to a number of such wireless communication ports, e.g. the per port power on the remaining local wireless ports 204A-B is increased from 0.33 to 0.5 watts. Absent this power increase the wireless communications to stations 110, 130 and 140 would be impaired. Additionally, power is also increased on wired port 204C to 2 watts so that the power at the "T" connector is sufficient to drive both the remote antenna and the direct connection to the HDTV.

After the static power settings on each RF port and associated transmit and receive chains is complete the port controller then controls show time communications. For downlinks the port controller may exploit the correlation information during either single user or multi-user downlinks with associated stations. During a single user downlink to HDTV 120 for example, the port controller 203 may temporarily save energy by reducing power on the transmit chains coupled to ports 204A-B which have no access to the downlinked station. Alternately, during a Multi User (MU) MIMO downlink to HDTV 120 and one of the remaining stations, e.g. station 110, the port controller can use a simplified or sparse precoding matrix to spatially multiplex the concurrent communications based on its knowledge of the separate signal paths of ports 204A-B versus port 204C with respect to the two targeted stations 110 and 120.

Figure 3G:
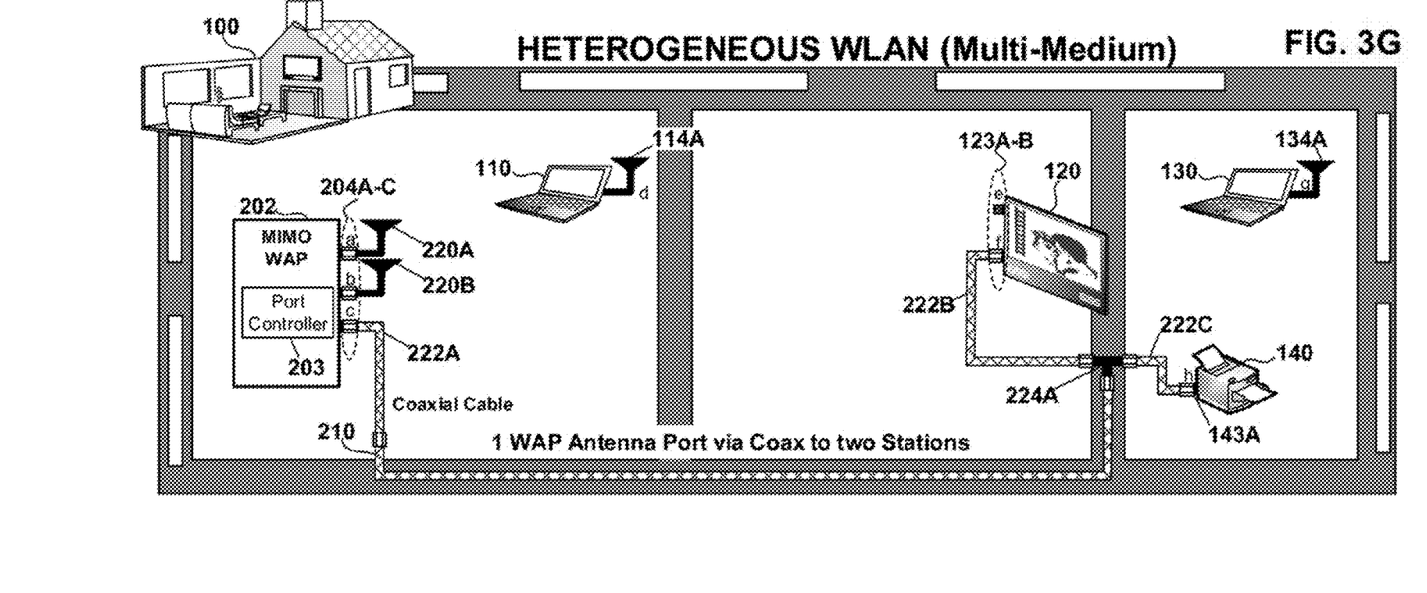

FIG. 3G shows an embodiment of the heterogeneous WLAN in residence 100. One of the WAP ports has a wired connection to two of the WLAN stations. Specifically, two of the RF ports, 204A-B of the WAP 202 are coupled to local antenna 220A-B, respectively. The remaining RF WAP port 204C has been coupled by the homeowner via coaxial cable connectors 222A-C, "T" connector 224A, and existing coaxial cable 210 to both HDTV station 120 at RF port 123B together with printer 140 at RF port 143A. The port controller 203 discovers and controls these heterogeneous RF port connections to varied communication mediums and stations as shown in FIG. 3H.

Figure 3H:
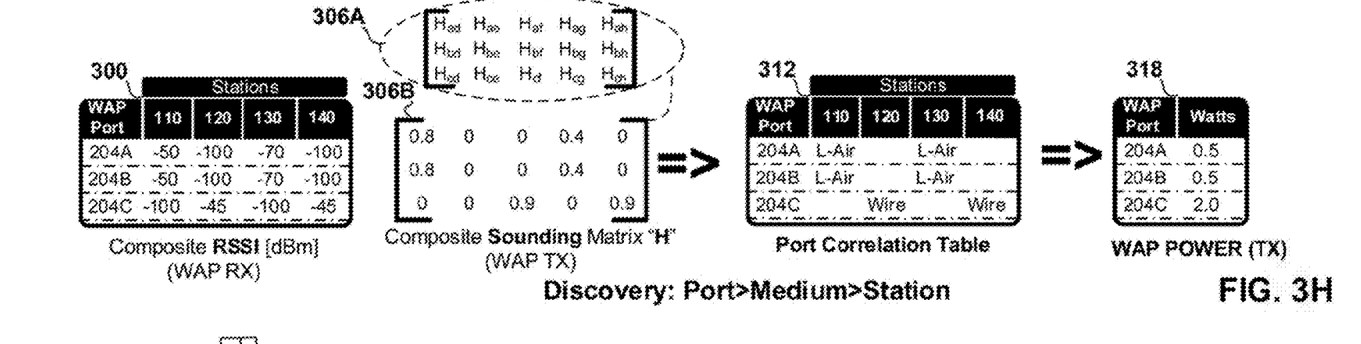

FIG. 3H shows a progression of various data processing tables and matrices associated with the discovery and control of the WAP's RF ports 204A-C by the port controller 203. During authentication, association and or show time the port controller evaluates the communication channel and specifically a RSSI for each station on each port as shown in composite RSSI table 300. During show time the port evaluates the communication channel between each port and each station via the corresponding coefficients 306B of a composite sounding matrix "H" 306A derived from one or more explicit or implicit soundings.

When evaluation of ports, stations and channels there between is completed processing proceeds to the port correlation table 312. The port correlation table correlates each port with the subset of WLAN stations accessible therefrom as well as the medium, e.g. wired or wireless, of communication there between. Stations 120 and 140 have a wired connection exclusively to port 204C as indicated by the inaccessibility of this station from any of the other RF ports as measured in either the composite RSSI table 300 or the composite sounding matrix 306B. Remaining stations 110, 130 are all accessible wirelessly via local antennas 220A-B on any of the remaining RF ports 204A-B.

Based on the port correlation table the per port power allocation is set by the port controller 203, as shown in the WAP power table 318. The port controller 203 varies the power on each of the remaining wireless RF ports inversely in relation to a number of such wireless communication ports, e.g. the per port power on the remaining wireless ports 204A-B is increased from 0.33 to 0.5 watts. Absent this power increase the wireless communications to stations 110, 130 would be impaired. Additionally, power is also increased on wired port 204C to 2 watts since the power mask constraints imposed by the IEEE 802.11 standard no longer apply.

After the static power settings on each RF port and associated transmit and receive chains is complete the port controller then controls show time communications. For downlinks the port controller may exploit the correlation information during either single user or multi-user downlinks with associated stations. During a single user downlink to HDTV 120 for example, the port controller 203 may temporarily save energy by reducing power on the transmit chains coupled to ports 204A-B which have no access to the downlinked station. Alternately, during a Multi User (MU) MIMO downlink to HDTV 120 and one of the remaining stations, e.g. station 110, the port controller can use a simplified or sparse precoding matrix to spatially multiplex the concurrent communications based on its knowledge of the orthogonality of ports 204A-B versus port 204C with respect to the two targeted stations 110 and 120. Additionally, in another embodiment of the invention, the port controller can implement orthogonal frequency multiplexing (OFDMA) for concurrent communications with wired stations 120 and 140 on the associated components of the transmit and receive chain coupled to port 204C.

Figure 3I:
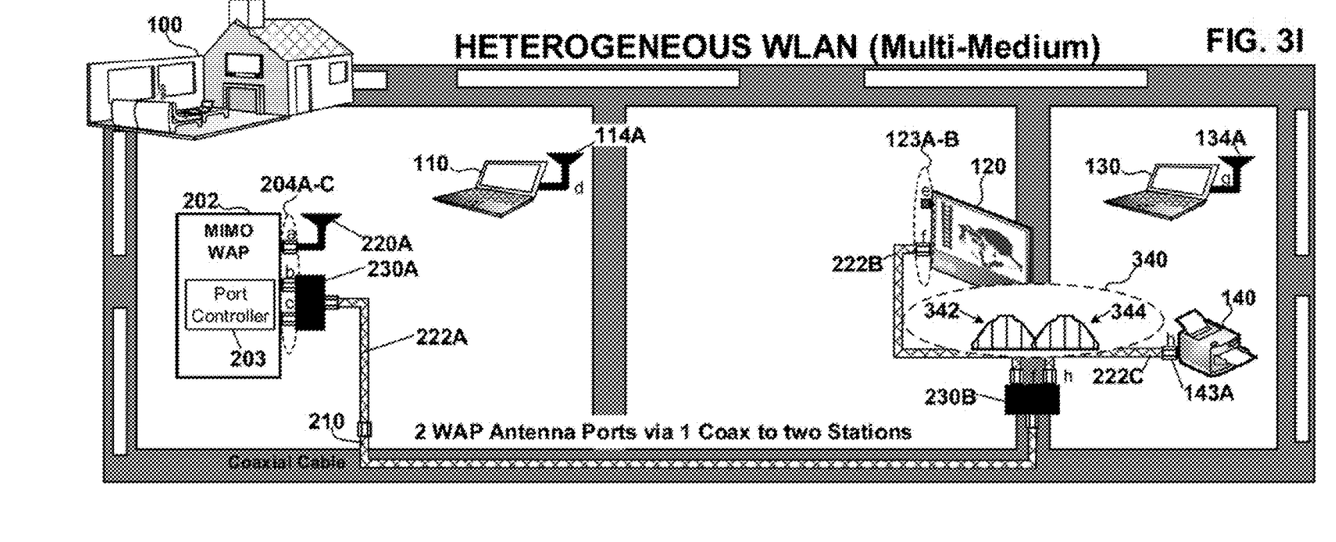

FIG. 3I shows an embodiment of the heterogeneous WLAN in residence 100. One of the WAP ports has a wired connection to two of the WLAN stations. Specifically, one of the RF ports, 204A of the WAP 202 is coupled to local antenna 220A. The remaining two RF WAP ports 204B-C have been coupled by the homeowner via pair of diplexers 230A-B, coaxial connectors 222A-C, and existing coaxial cable 210 to both HDTV station 120 at RF port 123B together with printer 140 at RF port 143A. The port controller 203 discovers and controls these heterogeneous RF port connections to varied communication mediums and stations as shown in FIG. 3J.

Figure 3J:
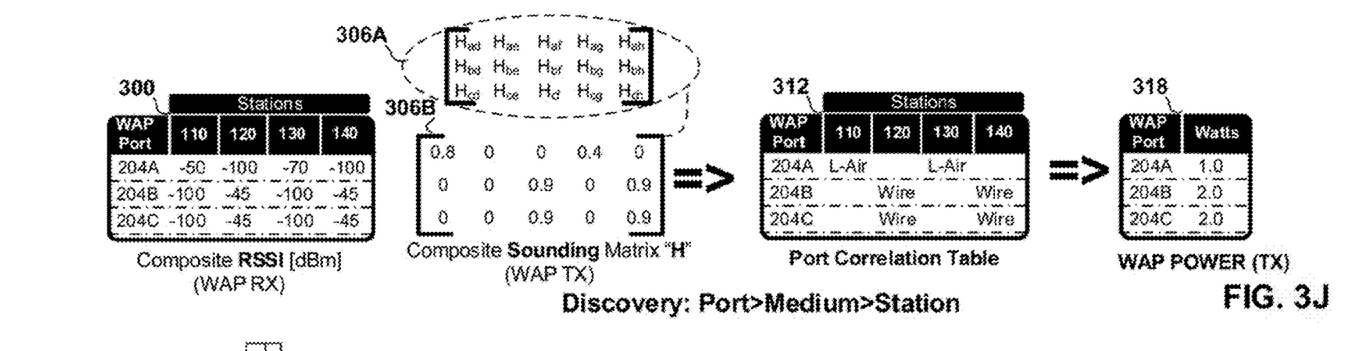

FIG. 3J shows a progression of various data processing tables and matrices associated with the discovery and control of the WAP's RF ports 204A-C by the port controller 203. During authentication, association and or show time the port controller evaluates the communication channel and specifically a RSSI for each station on each port as shown in composite RSSI table 300. During show time the port evaluates the communication channel between each port and each station via the corresponding coefficients 306B of a composite sounding matrix "H" 306A derived from one or more explicit or implicit soundings.

When evaluation of ports, stations and channels there between is completed processing proceeds to the port correlation table 312. The port correlation table correlates each port with the subset of WLAN stations accessible therefrom as well as the medium, e.g. wired or wireless, of communication there between. Stations 120 and 140 have a wired connection exclusively to ports 204B-C as indicated by the inaccessibility of this station from any of the other RF ports as measured in either the composite RSSI table 300 or the composite sounding matrix 306B. Remaining stations 110, 130 are all accessible wirelessly via local antenna 220A on the remaining RF port 204A.

Based on the port correlation table the per port power allocation is set by the port controller 203, as shown in the WAP power table 318. The port controller 203 varies the power on the remaining wireless RF port inversely in relation to a number of such wireless communication ports, e.g. the per port power on the remaining wireless port 204A is increased from 0.33 to 1.0 watt. Absent this power increase the wireless communications to stations 110, 130 would be impaired. Additionally, power is also increased on wired ports 204B-C to 2 watts since the power mask constraints imposed by the IEEE 802.11 standard no longer apply.

After the static power settings on each RF port and associated transmit and receive chains is complete the port controller then controls show time communications. For downlinks the port controller may exploit the correlation information during either single user or multi-user downlinks with associated stations. During a single user downlink to HDTV 120 for example, the port controller 203 may temporarily save energy by reducing power on the transmit chain coupled to port 204A which has no access to the downlinked station. Alternately, during a Multi User (MU) MIMO downlink to HDTV 120 and one of the remaining stations, e.g. station 110, the port controller can use a simplified or sparse precoding matrix to spatially multiplex the concurrent communications based on its knowledge of the orthogonality of ports 204A versus ports 204B-C with respect to the two targeted stations 110 and 120. Additionally, in another embodiment of the invention, the port controller can implement frequency multiplexing (FDMA) for concurrent communications with wired stations 120 and 140 on the transmit and receive chain coupled to ports 204B-C. Specifically, the diplexers allow ports 204B-C to operate concurrently on different channels in their communications with stations 120 and 140 respectively.

Figure 4:
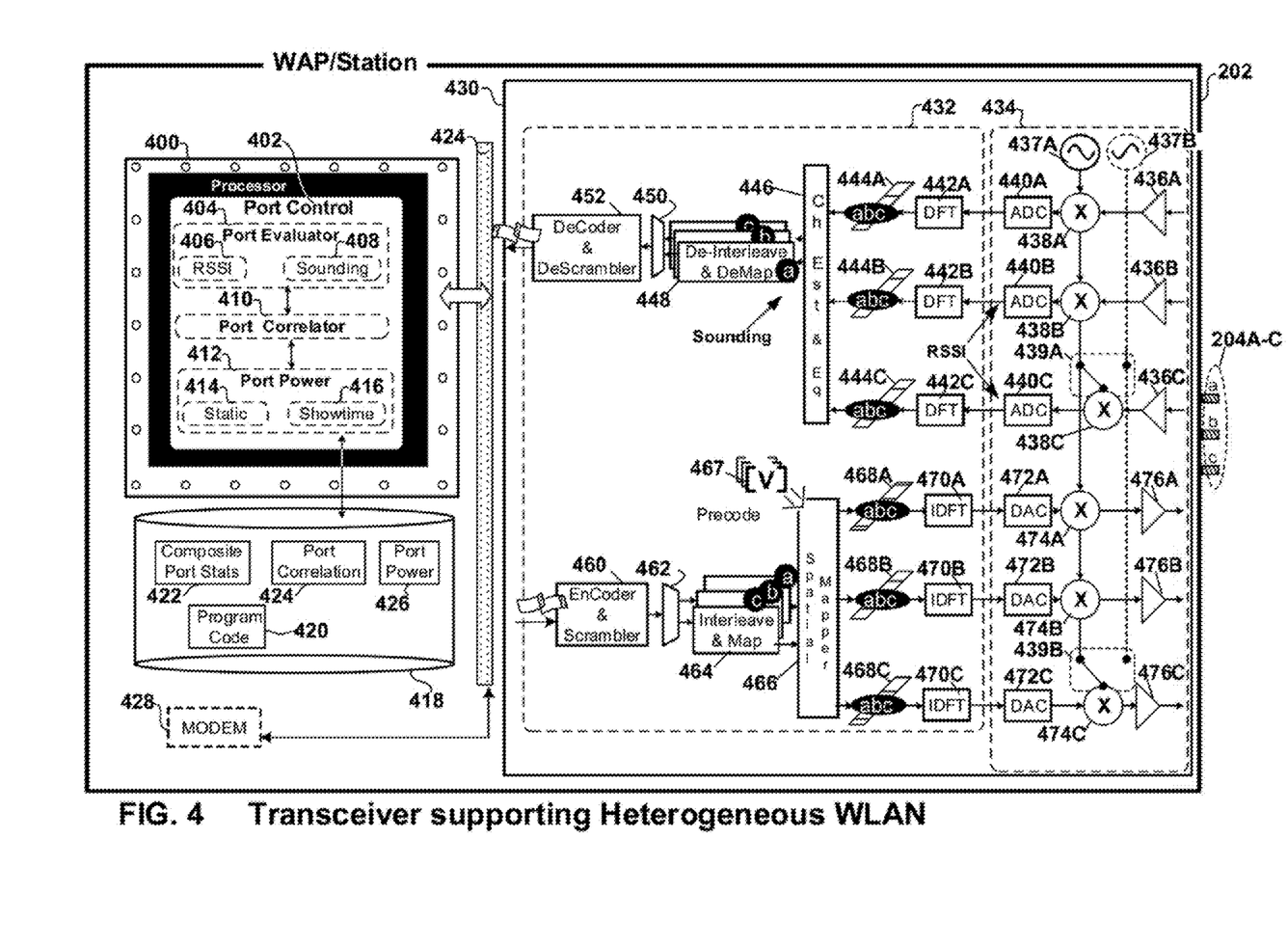
FIG. 4 is a hardware block diagram of a wireless transceiver for a heterogeneous WLAN in accordance with an embodiment of the invention.

FIG. 4 is a hardware block diagram of a wireless transceiver for a heterogeneous WLAN in accordance with an embodiment of the invention. The wireless transceiver can be either a wireless access point (WAP) or a station. For the remainder of this discussion the embodiment of the transceiver as a WAP will predominate. The wireless transceiver supports a mix of wired and wireless communications. The transceiver 202 in this embodiment of the invention is identified as a 3×3 MIMO WAP supporting as many as 3 discrete communication streams "a", "b", "c" over its three RF ports 204A-C. The WAP includes: the processor 400 and storage 412; a bus 424, a WLAN stage 430 including a base band stage 432, a radio frequency (RF) stage 434 and RF ports 204A-C. The WAP RF stage supports one or more IEEE 802.11 WLAN protocols. The WAP also includes a modem 428 for coupling via copper or fiber to an Internet Service Provider (ISP), not shown. The processor in addition to supporting the IEEE 802.11 WAP functionality also executes the program code which provides control of the heterogeneous ports 204A-C.

In the RF Stage 434 received communications "abc" on each of the three RF ports 204A-C are amplified in a corresponding one of the low noise amplifier 436A-C respectively associated with each of the three receive chains. Received communications on each chain are down converted in a corresponding one of downconverters 438A-C. In an embodiment of the invention the downconverters all share a common local oscillator 437A. Next in the corresponding one of the analog-to-digital (ADC) converters 440A-C communications from each port are digitized and passed to the baseband stage 432.

In the baseband stage the received communications are then transformed from the time to the frequency domain in the discrete Fourier Transform (DFT) modules 442A-C from which they are output as discrete orthogonal frequency division multiplexed (OFDM) tones/sub-carriers/sub-channels 444A-C. All received streams are then subject to channel estimation and equalization in the channel estimator and equalizer 446. Received steams "abc" are subject to de-interleaving and constellation demapping in associated deinterleaver demapper modules 448, followed by multiplexing in multiplexer 452. The received data "abc" is decoded and descrambled in decoder descrambler 452.

In the baseband stage 432 transmitted communications are encoded and scrambled in encoder scrambler module 460 and de-multiplexed into up to three streams in demultiplexer 462. Each stream "a", "b", "c" is subject to interleaving and constellation mapping in an associated interleaver mapper 464 and passed to the spatial mapper 466. The spatial mapper uses a beamsteering matrix 467 determined from prior soundings and from the port control 402 to steer subsequent MIMO transmissions to the target station or stations. The beamsteering matrix specifies specific phase and amplitude adjustments for the communications on each RF port designed to steering the outgoing communications toward the recipient station. There is a discrete beamsteering matrix for each of the OFDM tones or sub-channels. The combined streams, e.g. "abc" are injected into each of the OFDM tones or sub-channels 468A-C of the inverse discrete Fourier Transform (IDFT) modules 470A-C respectively. Each IDFT module is coupled via a corresponding one of the RF transmit chains to an associated one of the RF ports 204A-C.

Next, transmissions are passed to the RF Stage 434. In the corresponding one of the digital-to-analog (DAC) converters 472A-C communications are converted from digital to analog and then up converted in the associated one of the three up converters 474A-C. In an embodiment of the invention the up converters all share the common local oscillator 437A. Each up converted transmit communication on each chain is then subject to amplification in the corresponding one of amplifiers 476A-C and passed to the corresponding one of the MIMO RF ports 204A-C for transmission.

In an embodiment of the invention one or more of the chains can be operated at different frequency from the others. This allows FDMA communications on a single coaxial cable to two stations to be conducted. Optional oscillator 437B switchably coupled via switch 439A to downconverter 438C and switch 439B to upconverter 474C provides an embodiment of this functionality as discussed further in FIG. 3I.

Processor 400 and memory element or storage module 418 are configured to execute port control program code 420 associated with the port control module 402. The port controller module includes: the port evaluator 404, the port correlator 410 and the port power module 412. The port evaluator includes the RSSI and Sounding modules 406-408 respectively. The port power module 412 includes the static and show time power control modules 414, 416 respectively. In addition to program code, the storage module 418 includes: composite port statistics 422, port correlation records 424, and port power settings table 426.

In operation the port evaluator 404 evaluates the selected communication channel on each of the RF communication ports with respect to each of the stations with which it is associated. The channel evaluation includes RSSI evaluation of each port with respect to each associated station in the RSSI module 406. RSSI is measured at the output of the ADCs 440A-C on each receive chain as authentication, association or show time packets are received from each station. The channel evaluation also includes an evaluation of the explicit or implicit soundings of each station on each port in the sounding module 408. Explicit sounding feedback is obtained at the output of the channel estimator and equalizer 446. Implicit sounding of a channel is also obtained at the output of the channel estimator and equalizer.

The port correlator 410 correlates each station with a corresponding subset of the RF communication ports supporting optimal communications therewith based on the evaluation by the port evaluator. The port correlator in an embodiment of the Invention, utilizes the information as to the accessibility of each station from each port to set per chain power in the port power module and specifically the static power control module 414 thereof. The port correlator in another embodiment of the invention, utilizes the information as to the accessibility of each station from each port to dynamically set per chain power in the port power module and specifically the show time power control module 416 thereof. For example, during a downlink to a targeted station accessible only via a single one of the MIMO RF ports the port correlator will temporarily reduce power on all or part of the transmit chain components coupled to the other RF ports which do not have access to the station targeted for the downlink. In another embodiment of the invention the port correlator will increase the Modulation and Coding Schema (MCS) index for downlink communications on a port coupled to a wired communication medium, due to the flatter spectrum and reduced signal-to-noise ratio associated with a wired communication medium. In another embodiment of the invention the port correlator may initiate frequency division multiple access (FDMA) on a wired medium coupled to more than one station, thereby allowing concurrent downlink communications thereto. In another embodiment of the invention the port correlator may determine that a multi-user (MU) MIMO downlink may be made to two stations accessible exclusively via different ones of the RF ports.

Figure 5:
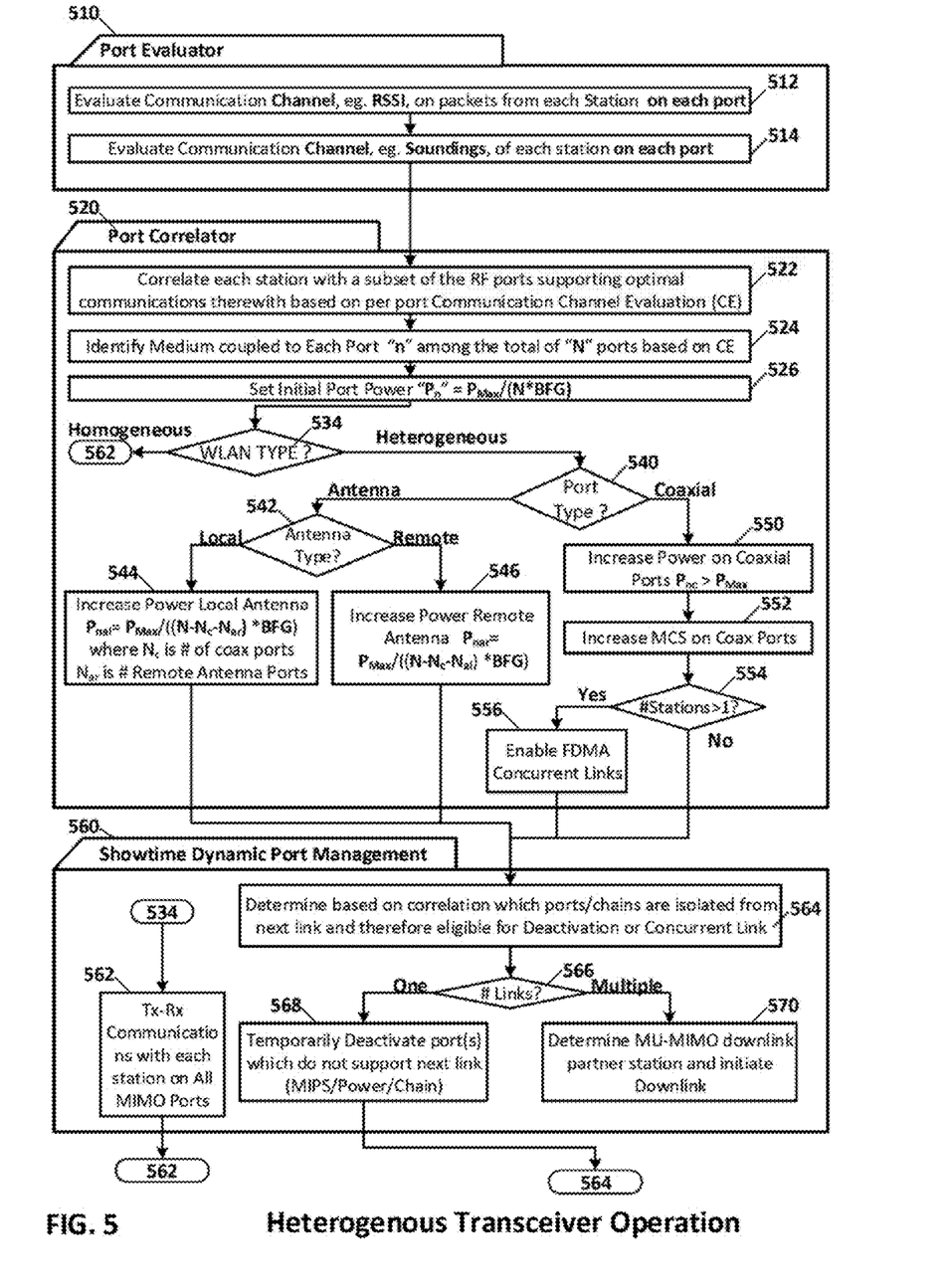
FIG. 5 is a process flow diagram of processes associated with operation of a wireless transceiver in accordance with an embodiment of the invention.

FIG. 5 is a process flow diagram of processes associated with operation of a wireless transceiver in accordance with an embodiment of the invention. Processing begins in the block of processes 510 associated with evaluation of each of the transceiver ports. In port evaluation process 512 the communication channel on packets from each station is evaluated on each port for received signal strength indicator (RSSI). The RSSI evaluation may be conducted during any one or all of: authentication, association, and show time operation of the wireless local area network (WLAN). In port evaluation process 514 the communication channel to each station on each port is evaluated based on either explicit or implicit channel soundings. In an alternate embodiment of the invention channel evaluation may also include: signal-to-noise ratio (SNR) of the channel on each port with respect to each station.

Control then passes to the block of processes 520 associated with port correlation. In process 522 each station is correlated with a subset of the RF ports supporting optimal communications therewith based on the per port communication channel evaluation discussed above. Then in process 524 the communication channel evaluation is also used to identify the communication medium, e.g. wired or wireless, coupled to each port "n" among the total of "N" RF ports. Next in process 526 the power on each of the RF ports is initialized as set for the in the following Equation 1.

$$P_n = \frac{P_{max}}{(N*BFG)} \quad \text{Equation 1}$$

where Pmax is the maximum wireless power on all ports proscribed by the applicable IEEE 802.11 standard, for example 1 watt and where N is the total number of RF ports and BFG is the beamforming gain.

Next control is passed to decision process 534. In decision process 534 a determination is made as to WLAN type. If all ports are coupled to local antenna, then the WLAN is homogeneous and control is passed to process 562. Alternately, if one or more of the ports is coupled to a wired communication medium, e.g. a coaxial cable, then the WLAN is heterogeneous as is comprises both wireless and wired communication medium on different ports.

Control then passes to decision process 540 in which the ports are split into groups depending on whether they are coupled to an antenna or coupled directly to one or more stations via a coaxial cable. Processing for the coaxial connected RF ports is passed to process 550. In process 550 the power on each port coupled to a coaxial cable is increased since the IEEE WAP and station power mask limit proscribed by the standard does not apply to ports with a direct coaxial coupling to a station. Control then passes to process 552 in which the modulation and coding schema (MCS) index for communications on each coaxially connected RF port is increased. This is possible because of the increased signal-to-noise ratio (SNR) and uniformity of the SNR across the communication channel which characterizes a coaxial connection. Next control passes to decision process 554 in which a determination is made as to whether any of the RF ports coupled to a coaxial cable are coupled via that cable to more than one station. If port is coupled to more than one station then that port or combination of ports may be enabled via frequency division multiple access (FDMA) for concurrent communications with the stations in process 556. In an embodiment of the invention as shown in FIG. 3G a single port and associated chain coupled via a coaxial cable to two or more stations may implement FDMA within the sub-channels of a selected communication channel using what is called orthogonal frequency division multiple access (OFDMA). In an embodiment of the invention as shown in FIG. 3I two or more ports and associated chains coupled via a coaxial cable to two or more stations may implement FDMA using distinct communication channels on the different chains to concurrently communicate over the single coaxial cable with the two or more stations. Control then passes to the block of processes 560.

If alternately in decision process 540 the port or ports coupled to antenna are being processed then control passed to decision process 542. In detection process 542 a determination is made as to the antenna type, i.e. local or remote associated with each port in the subject group. In process 544 power on each port coupled to local antenna is increased as indicated in the following Equation 2:

$$P_{nal} = \frac{P_{max}}{((N - Nc - Nar)*BFG)} \quad \text{Equation 2}$$

where Nc is the number of ports coupled to coaxial cable and Nar is the number of ports coupled to remote antenna. In process 546 power on each port coupled to remote antenna is increased as indicated in the following Equation 3:

$$P_{nar} = \frac{P_{max}}{((N - Nc - Nal)*BFG)} \quad \text{Equation 3}$$

where Nc is the number of ports coupled to coaxial cable and Nal is the number of ports coupled to local antenna. These power increases are possible due to the manner in which the IEEE 802.11 standard measures the RF power limit, i.e. at a point source. Since local and remote antenna are not collocated they can at a minimum be treated separately for purposes of the appropriate per port power level. In another embodiment of the invention channel evaluation can be used to further distinguish among remote antenna any subset of antenna which is not collocated with the other remote antenna with the further refinement that its power can be subject to a further increase. Control then passes to the block of processes 560.

The block of processes 560 associated with RF port management during show time have distinct branches, depending on the nature of the WLAN, i.e. homogeneous or heterogeneous. If the WLAN is homogeneous control is passed to process 562 in which transmit and receive communications on all ports are effected using beamforming on all the MIMO RF ports and locally coupled antenna. Alternately, if the WLAN is heterogeneous control is passed to process 564. In process 564 a determination is made based on the correlation of ports with stations as to which ports and associated chains can not be used to support the next link and its target station(s). Once the isolated ports have been identified, i.e. the ports that can't support or access the next communication link, a determination is made as to whether the ports are temporarily placed in power save mode, or utilized specifically because of their isolation for a concurrent, i.e. MU-MIMO downlink for example. In decision process 566 said determination is made. If only the next single link to the single station is to be serviced then control passes to process 568. In process 568 the isolated ports that can't service the link, and all or part of their associated chain(s) of components are temporarily deactivated by reducing processing MIPS or by cutting power to specific components on the associated transmit or receive chain. Alternately, if in decision process 566 a determination is made that the isolated port and associated chain(s) will be utilized for an additional and concurrent link then control is passed to process 570. In process 570 the power is maintained on the isolated port(s) and they are used to concurrently service a MU-MIMO downlink.

Information derived during port correlation may also be used to improve WLAN medium access control (MAC). A WAP can initiate RTS/CTS per STA, as explained in section 9.3.1. of 802.11 specification. The use of the RTS/CTS mechanism is under control of the RTS threshold attribute. This attribute may be set on a per-STA basis. This mechanism allows STAs to be configured to initiate RTS/CTS either always, never, or only on frames longer than a specified length. So basically WAP could tell only STAs that are directly connected to wire, or connected to remote antenna, to send RTS and wait for CTS before sending any data frame, and leave other STAs free to send packets. This would however put some STAs at a disadvantage with respect to other ones. So to be fair it will likely tell all STAs to use RTS/CTS. Any STA that wants to send a packet, sends an RTS, and WAP will send a CTS on all ports to tell other STAs to be quiet and tell the target STA to send its packet. Alternately, the CTS-to-self mechanism can be used for MAC management. In this case, WAP would schedule a STA to send uplink packets by sending CTS on those ports only that are NOT connected to the target STA in order to quiet other STAs.

The components and processes disclosed herein may be implemented a software, hardware, firmware, or a combination thereof including program code software, a memory element for storing the program code software and a processor for executing the program code software, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A wireless access point (WAP) apparatus supporting wireless communications with associated stations on a selected communication channel of a wireless local area network (WLAN); and the WAP apparatus comprising:
   a plurality of shared and discrete components coupled to one another to form a plurality of transmit and receive chains each coupled to a corresponding one of the plurality of RF communication ports for orthogonal frequency division multiplexed (OFDM) multiple-input multiple-output (MIMO) WLAN communications with the associated stations;
   the plurality of radio frequency "RF" communication ports each configured to mechanically couple to any one of: a coaxial cable direct connected to one of the associated stations, a coaxial cable direct connected to a remote antenna, and an antenna; to allow on premises installation of the WAP apparatus with a customized mix of wired and wireless communication medium coupled to the plurality of RF communication ports;
   a port evaluator coupled to each of the plurality of RF communication ports to evaluate the selected communication channel on each of the RF communication ports with respect to each of the associated stations; and
   a port correlator coupled to the plurality of components and the port evaluator and configured to correlate each of the associated stations with a corresponding subset of the RF communication ports supporting optimal communications therewith based on the evaluation by the port evaluator.

2. The WAP apparatus of claim 1, further comprising:
   the port correlator further configured to dynamically manage power on the RF communication ports during each downlink to a corresponding one of the associated stations by reducing power on RF communication ports which do not support communications with the corresponding one of the associated stations during downlink communications therewith.

3. The WAP apparatus of claim 1, further comprising:
   the port correlator responsive to the evaluation of the communication channel on each RF communication port by the port evaluator to identify a type of communication medium coupled to each RF communication port as one of a wired type and a wireless type and to set a power level for an RF communication port direct coupled to an associated one of the stations via a coaxial cable, independently of the power levels for remaining ones of the RF communication ports coupled to corresponding antenna.

4. A wireless transceiver apparatus for a wireless local area network (WLAN), supporting multiple-input multiple-output (MIMO) wireless communications between associated transceiver nodes on a selected one of a plurality of communication channels; and the transceiver apparatus comprising:
   a plurality of radio frequency "RF" communication ports configured to couple to at least one of a wired and a wireless communication medium;

a plurality of shared and discrete components coupled to one another to form transmit and receive chains each coupled to a corresponding one of the plurality of RF communication ports for orthogonal frequency division multiplexed (OFDM) multiple-input multiple-output (MIMO) WLAN communications with the plurality of associated transceiver nodes;

a port evaluator coupled to each of the plurality of RF communication ports and configured to evaluate the selected communication channel on each of the RF communication ports with respect to each of the plurality of transceiver nodes; and a port correlator coupled to the plurality of components and the port evaluator and configured to correlate each of the plurality of transceiver nodes with a corresponding subset of the RF communication ports supporting optimal communications therewith based on the evaluation by the port evaluator; and the port correlator further configured to determine a number of communication ports coupled to a wireless communication medium and to vary power on each of said ports inversely in relation to a number of such wireless communication ports, thereby increasing power on each communication port coupled to a wireless communication medium as a number of such ports decreases.

5. A method for operating a wireless access point (WAP) supporting wireless communications with associated stations on a selected communication channel of a wireless local area network (WLAN); and the method comprising:

providing a plurality of shared and discrete components coupled to one another to form a plurality of transmit and receive chains each coupled to a corresponding one of a plurality of RF communication ports for orthogonal frequency division multiplexed (OFDM) multiple-input multiple-output (MIMO) WLAN communications with the associated stations;

providing a plurality of radio frequency "RF" communication ports configured to mechanically couple to any one of: a coaxial cable direct connected to one of the associated stations, a coaxial cable direct connected to a remote antenna, and an antenna; to allow on premises installation of the WAP apparatus with a customized mix of wired and wireless communication medium coupled to the plurality of RF communication ports;

evaluating the selected communication channel on each of the RF communication ports with respect to each of the stations; and correlating each of the associated stations with a corresponding subset of the RF communication ports supporting optimal communications therewith based on the evaluating act.

6. The method for operating a WAP of claim 5, wherein the correlating act further comprises:

dynamically manage power on the RF communication ports during each downlink to a corresponding one of the associated stations by:
reducing power on RF communication ports which do not support communications with the corresponding one of the associated stations during downlink communications therewith.

7. The method for operating a WAP of claim 5, wherein the correlating act further comprises:

identifying a type of communication medium between each port and accessible ones of the plurality of transceiver nodes as one of a wired type and a wireless type; and setting a power level for an RF communication port direct coupled to an associated one of the stations via a coaxial cable, independently of the power levels for remaining ones of the RF communication ports coupled to corresponding antenna.

8. A method for operating a wireless transceiver apparatus for a wireless local area network (WLAN), supporting multiple-input multiple-output (MIMO) wireless communications between associated transceiver nodes on a selected one of a plurality of communication channels; and the method comprising:

providing a plurality of radio frequency "RF" communication ports configured to couple to at least one of a wired and a wireless communication medium;

evaluating the selected communication channel on each of the RF communication ports with respect to each of the plurality of transceiver nodes; and correlating each of the plurality of transceiver nodes with a corresponding subset of the RF communication ports supporting optimal communications therewith based on the evaluating act, including:
determining a number of communication ports coupled to a wireless communication medium; and
varying power on each of said ports determined in the determining act, inversely in relation to a number of such wireless communication ports, thereby increasing power on each communication port coupled to a wireless communication medium as a number of such ports decreases.

* * * * *